May 25, 1937.  R. J. BARTHOLOMEW  2,081,573
THREAD COVERING MACHINE
Filed Jan. 24, 1935  2 Sheets-Sheet 1

INVENTOR
Robert J. Bartholomew,
BY
Kiddle, Bethell and Montgomery.
ATTORNEYS

May 25, 1937.  R. J. BARTHOLOMEW  2,081,573
THREAD COVERING MACHINE
Filed Jan. 24, 1935    2 Sheets-Sheet 2
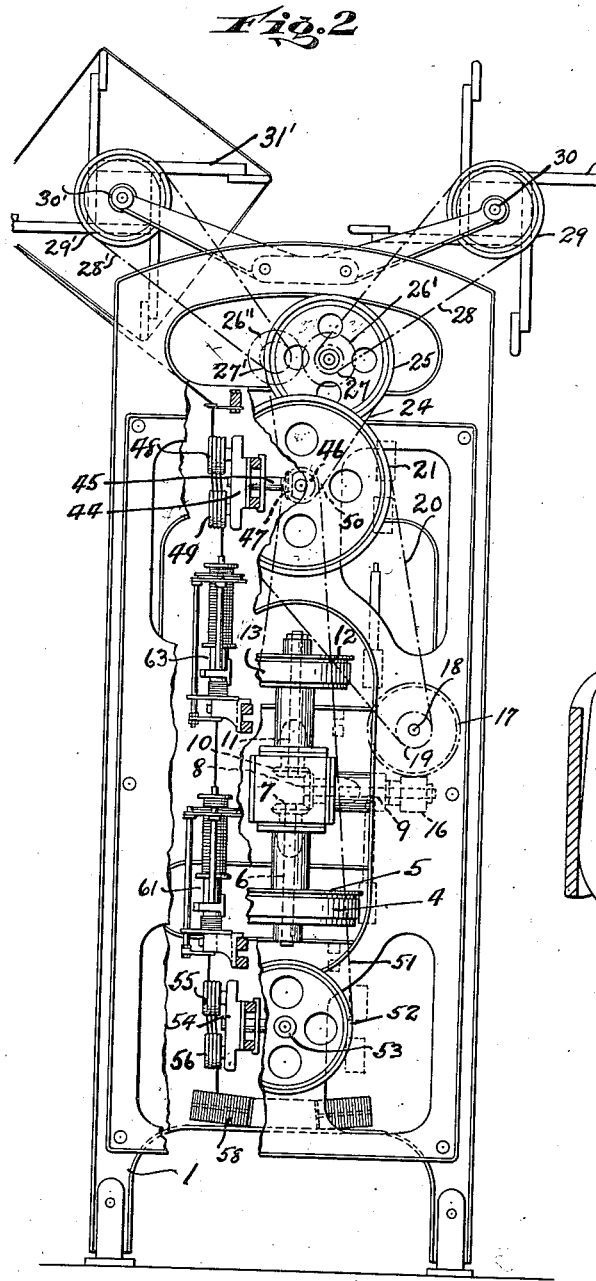
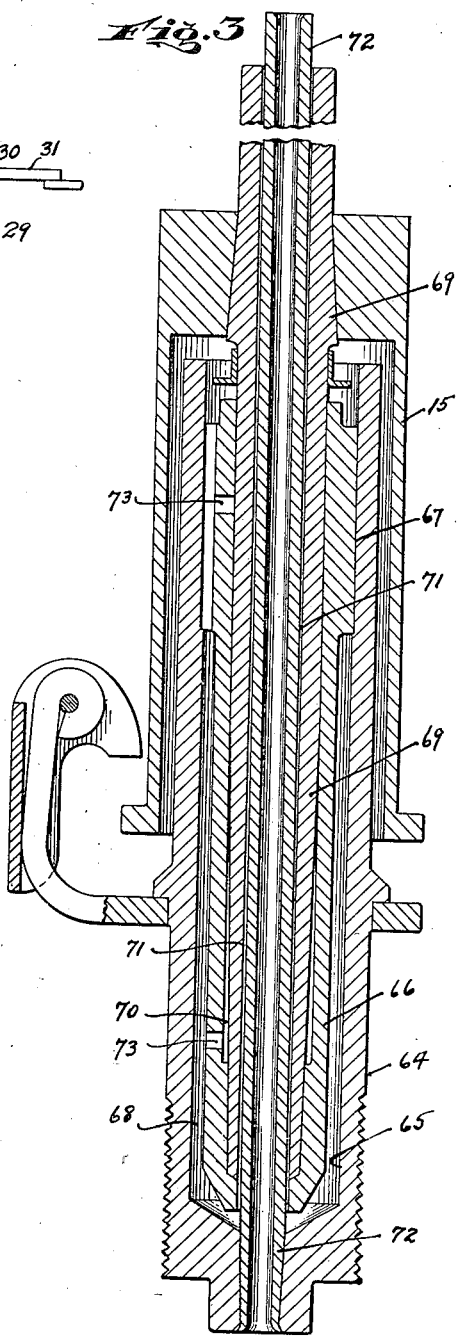
INVENTOR
Robert J. Bartholomew,
BY
Kiddle, Bethell and Montgomery
ATTORNEYS

UNITED STATES PATENT OFFICE 2,081,573

THREAD COVERING MACHINE

Robert J. Bartholomew, Germantown, Pa., assignor to Fletcher Works, Incorporated, Philadelphia, Pa., a corporation of Pennsylvania Application January 24, 1935, Serial No. 3,245

6 Claims. (Cl. 117—34)

This invention relates to thread covering machines and is particularly directed to machines for applying covering thread to other thread, such as rubber, lastex, cotton and the like.

Among the objects of this invention are the provision of an improved drive for double-deck thread covering machines and an improved spindle construction particularly well adapted for use in such machines.

In the accompanying drawings wherein I have illustrated an embodiment of my invention:

Fig. 2 is an end elevational view of the same; and

Fig. 3 is a sectional view of my improved spindle.

Figure 1:
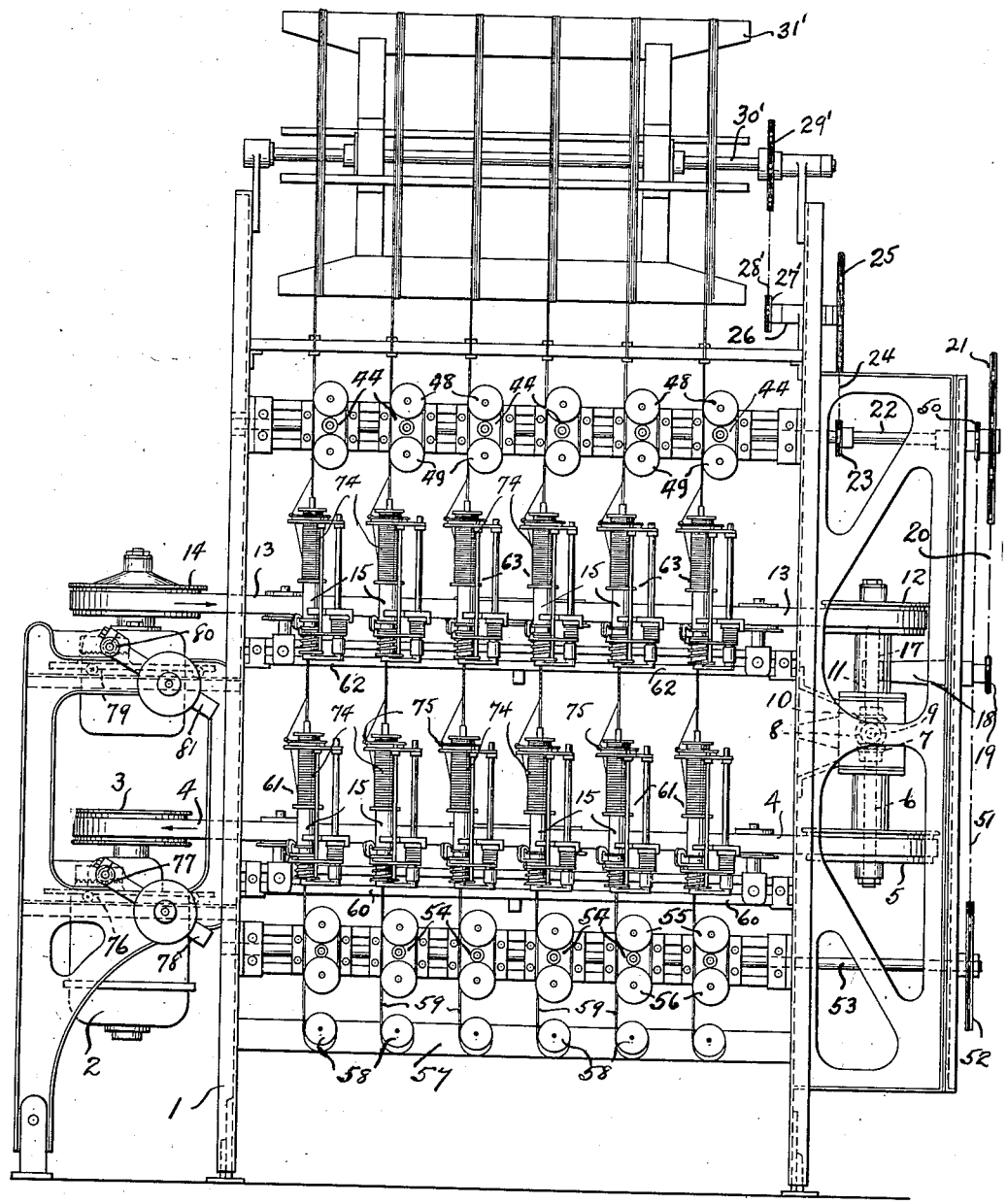
Fig. 1 is an elevational view of a machine constructed in accordance with my invention.

Referring to the drawings in detail, I designates the frame of the machine which supports a driving motor 2 mounted at one end of the machine. This motor is provided with a pulley 3 for receiving an endless belt 4 extending across the machine to the other side where it is received by another pulley 5. This pulley 5 is keyed to a vertically extending shaft 6, the upper end of which is provided with a bevel gear 7 meshing with gear 8 carried by a horizontal shaft 9. The gear 8 also meshes with a bevel gear 10 on vertical shaft 11 which in turn carries another pulley 12.

The pulley 12 receives an endless belt 13 extending across the machine to the opposite end thereof where it is received by another pulley 14. It will be obvious from this description that the belt 4 of the lower deck travels in the opposite direction to the belt 13 of the upper deck, the reversal of direction being accomplished by means of the gears 7, 8, and 10.

The belts 4 and 13 engage the whorls 15 of their respective decks for driving the same in a well-known manner.

The horizontal shaft 9 above referred to carries a worm 16 at the end opposite the gear 8, this worm meshing with a worm wheel 17 mounted on the shaft 18 which also carries a sprocket 19.

Carried by the pulley is an endless chain 20 passing over a sprocket 21 mounted on the outer end of shaft 22.

The shaft 22 also carries a sprocket 23, in turn carrying chain 24 extending over sprocket 25 on the shaft 26. This shaft carries a sprocket 27 in turn carrying a chain 28 for driving sprocket 29 on the shaft 30 for the fly 31.

The shaft carries a gear 26' meshing with gear 26'' the latter being mounted on a shaft carrying sprocket 27', which drives a chain 28' on sprocket 29' on the shaft 30' for driving the fly 31'.

The shaft 22 rotates a plurality of heads 44 for the upper deck of the machine. These heads are mounted on stub shafts 45 which are rotatably connected to the shaft 22 by means of bevel gears 46 and 47. Each of the heads 44 carries a pair of rollers 48 and 49 for advancing the thread to be covered as will be more fully explained hereinafter.

The shaft 22 above referred to carries a sprocket 50 adjacent its outer end for a chain 51, mounted on a sprocket 52 on a shaft 53 adjacent the bottom of the machine. This shaft, which extends across the machine, drives a lower bank of heads 54 through a gear train similar to that referred to in connection with the heads 44. Each of these heads carries a pair of rollers 55, 56 the function of which will also be more fully explained hereinafter.

The frame I of the machine is provided with a number of cross bars, the lowermost one 57 of which supports a plurality of spools 58 carrying the thread 59 to be covered. These spools 58 are in line with the heads 54 already referred to. Another cross bar 60 is provided for a plurality of spindles 61 of the lower deck, these spindles being in line with the heads 54, while a cross bar 62 is provided for the spindles 63 of the upper deck, these spindles being in line with the spindles of the lower deck. The heads 44 of the upper deck are in line with the spindles of the upper deck. In other words, the spools, heads and spindles are in vertical alignment.

Each of the spindles above referred to is of novel construction and comprises a base 64 screw threaded on its exterior for securing the same in place to the machine.

The base 64 has the usual bore 65 for a bolster 66 which is a press fit therein as shown at 67, the remainder of the bolster being spaced from the wall of the spindle base to provide an oil reservoir 68. The bolster 66 receives the spindle blade 69 which is rotatable therein and which is slightly tapered to provide a space 70 between the blade and the wall of the bolster. The blade 69 is also provided with a longitudinal bore 71 for receiving a small tube 72. This tube extends through the bore in the spindle blade and projects therefrom at both ends, the lower end of the tube being secured to the base 64. The tube 72 is slightly spaced from the walls of the bore 71 to provide for oil circulation as will be brought out hereinafter.

It will be noted that the spindle blade 69 is supported entirely by the bolster 66.

The oil in the spindle structure circulates downward between the bolster 66 and the spindle base 64 and upward in the space 70 between the blade 69 and the bolster, the bolster being provided with transverse openings 73 for the passage of oil from space 68 to space 70. The oil is also free to enter between the tube 72 and the bolster and to the inside of the blade around the lower end of the bolster.

Each spindle blade carries a bobbin 74 of covering thread, the bobbins of the lower deck carrying the first covering thread and the bobbins of the upper deck carrying the second covering thread, the latter being applied to the core thread 59 in a direction reverse to the direction of application of the first covering thread.

The core thread 59 is withdrawn from the spools 58 by means of the rollers 55 and 56 of the rotating heads 54 and passes up through the tube 72 in the spindle blade 69. As the core thread emerges from the upper end of the tube the covering thread from the bobbins of the lower deck is applied thereto, this first covering thread passing from the rotating bobbin, which is driven by the belt 4, through guide 75 and is wrapped around the core thread in the direction of rotation of the bobbin.

The core thread and its first covering thread then passes upwardly through the corresponding hollow tube of the spindle of the upper deck where a second covering thread is wrapped about the same. This second covering thread it will be noted is wrapped in the opposite direction to the first covering thread due to the fact that the bobbins of the upper deck are rotating in the opposite direction as hereinbefore mentioned. As the double covered thread leaves the spindle of the upper deck it is drawn by the rollers 48 and 49 of the rotating head 44 and thence to the fly 31' where it is wound up.

It will be noted from the drawings that the heads 44 rotate at a greater speed than the heads 54 to provide the necessary tension in the core thread as it passes through the spindles.

The driving motor 2 is mounted on an adjustable bracket 76. This bracket is provided with a rack engaged by pinion 77 carried by weighted lever 78. This lever as will be seen from the drawings is so disposed as to tend to move the motor 2 to the left, as viewed in Fig. 1, thereby maintaining the belt 4 under tension.

The pulley 14 is similarly mounted, the bracket being designated 79, the pinion 80 and weighted lever 81.

It will be noted that two sets of spindles are provided for each deck, one in the front of the machine and the other to the rear, and it will be understood that the belts 4 and 13 drive both sets of spindles of each deck.

It is to be understood that while I have illustrated and described one embodiment of my invention I do not wish to be limited to this precise structure as obviously various modifications and changes may be made therein without departing from the spirit and scope of my invention.

What I claim is:—

1. In combination a tubular spindle blade, a bolster for supporting said blade, a spindle base, said bolster being supported by said base adjacent its upper end and being spaced from the bore of said base below the point of support to provide an oil reservoir, a hollow tube within said spindle blade, said tube being spaced from said bolster to provide for the circulation of oil about the base of said blade.

2. In combination a tubular spindle blade, a bolster, said blade being wholly supported by and rotatable in said bolster, a spindle base, said bolster being supported by said base adjacent its upper end and being spaced from the bore of said base for the remainder of its length to provide an oil reservoir between the base and bolster, said spindle blade being tapered toward its lower end to provide an oil circulating space between the blade and bolster, and a hollow tube within said spindle blade projecting from the lower end thereof, the projecting end of said tube being secured to said base.

3. In combination a tubular spindle blade, a bolster, said blade being wholly supported by and rotatable in said bolster, a spindle base, said bolster being rigidly supported by said base adjacent its upper end and being spaced from the bore of said base for the remainder of its length to provide an oil reservoir between the base and bolster, said spindle blade being tapered toward its lower end to provide an oil circulating space between the blade and bolster, said base being provided with an opening providing communication between said oil reservoir and said oil circulating space.

4. In combination a base, a hollow bolster, the upper end of said bolster having a press fit in said base, the entire bolster below said press fit being of such outside dimensions relatively to the bore in said base as to be maintained out of contact with the walls of said bore to provide an oil reservoir about the bolster, a hollow spindle blade in said bolster, a hollow tube within said blade and projecting from both ends thereof, the lower projecting end of said tube being secured to said base.

5. In combination, a spindle base, a bolster rigidly mounted therein, a hollow spindle blade mounted for rotation in said bolster, said bolster throughout a portion of its length being spaced from the spindle base to provide an oil reservoir, said spindle blade being spaced throughout part of its length from said bolster to provide an oil reservoir, said reservoirs communicating with each other, and a hollow tube extending lengthwise through said spindle blade and projecting beyond each end thereof, one of said projecting ends being rigidly mounted in said spindle base.

6. An oil circulating hollow spindle structure comprising a base, a tube secured to the lower end of the base, a bearing member secured to the base, the lower portion of said bearing member being spaced from the base and tube, forming an oil reservoir, a tubular blade supported solely by said bearing member and having a downward tapering portion which lifts the oil, and a plurality of passages between the bearing and the reservoir.

ROBERT J. BARTHOLOMEW.